United States Patent [19]

Hara et al.

[11] Patent Number: 4,488,678
[45] Date of Patent: Dec. 18, 1984

[54] METHOD AND APPARATUS FOR READING A BAR CODE

[75] Inventors: Masahiro Hara, Kariya; Atsutoshi Okamoto, Aichi; Toshiyasu Sakai, Kariya, all of Japan

[73] Assignee: Nippondenso Co., Ltd., Kariya, Japan

[21] Appl. No.: 384,749

[22] Filed: Jun. 3, 1982

[30] Foreign Application Priority Data

Jun. 11, 1981 [JP] Japan ................................. 56-90629

[51] Int. Cl.³ ............................................. G06K 7/14
[52] U.S. Cl. ....................................... 235/463; 235/462
[58] Field of Search ................................. 235/462, 463

[56] References Cited

U.S. PATENT DOCUMENTS

| | | | |
|---|---|---|---|
| 3,979,577 | 9/1976 | Seligman | 235/494 |
| 4,184,179 | 1/1980 | Deming | 360/44 |
| 4,210,802 | 7/1980 | Sakai | 235/483 |
| 4,282,426 | 8/1981 | Neseem et al. | 235/463 |
| 4,308,455 | 12/1981 | Bullis et al. | 235/463 |
| 4,346,292 | 8/1982 | Routt, Jr. et al. | 250/216 |
| 4,354,101 | 10/1982 | Hester et al. | 235/463 |
| 4,414,468 | 11/1983 | Laurer et al. | 235/462 |

Primary Examiner—Stafford D. Schreyer
Assistant Examiner—Robert Lev
Attorney, Agent, or Firm—Cushman, Darby & Cushman

[57] ABSTRACT

A bar code having parallel bars carrying information is divided into a plurality of regions so that each region is detected by a field of vision of an image sensor of a bar code reader. The bars in each region are detected by a scanning operation to store data indicative of the width of each bar into a memory. When scanning of a region is completed, detection of another region follows to store data in the same manner. After all the regions are scanned to obtain their data, these data are combined to produce a combined data. Some superfluous data due to overlapping of two consecutive regions are removed from the combined data. In one embodiment, the superfluous data are removed by using data indicative separation bars provided between the two consecutive regions, while in another embodiment, the superfluous data are removed by using a predetermined value indicative of the actual number of bars of the bar code.

11 Claims, 5 Drawing Figures

METHOD AND APPARATUS FOR READING A BAR CODE

BACKGROUND OF THE INVENTION

This invention relates generally to method and apparatus for reading a bar code with automatic scanning so that bar-coded information printed on a label or the like which is attached to goods, can be recognized.

Conventionally, a light pen is known as a tool for scanning an image of a bar code by manual operation of movement in a direction normal to the longitudinal direction of each parallel bar of a bar code. However, since a sensor used in a light pen or the like is not of self-scanning type, the reading accuracy is greately affected by the speed of scanning manually performed.

On the other hand, in a bar code reading apparatus of electronic scanning type using an image sensor of self-scanning type, since scanning in a direction normal to the longitudinal direction of the parallel bars is electronically effected, no manual operation is needed. Although scanning can be effected desirably with such an electronic scanning type bar code reading apparatus, such a reading apparatus has suffered from a drawback caused by the use of a lens. Namely, since the image sensor of such apparatus is stationary with respect to the bar code, the image of a bar code on a curved label is apt to be unfocussed in connection with bars at both ends of the label if these bars are located beyond the focal depth of the lens used for condensing the light from the bar code. This tendency increases as the curvature of the bar code label increases. Because of such an unfocussed image on the image sensor, the widths of bars at both ends are apt to be erroneously detected. Furthermore, the bars at both ends will be imaged with narrower images than their actual widths. As a result, a bar code attached to a curved portion is difficult to read, and thus error reading likely occurs. Furthermore, it is impossible to perform reading when the width of a bar code is wider than a single field of vision with which an image can be obtained on the image sensor.

Although a light pen is known as a tool which is capable of scanning in a direction normal to the longitudinal direction of a bar code, it is difficult to scan all the bars at a constant speed along a curved surface by only a manual operation, and thus decoding is difficult, while there is a drawback that error in reading frequently occurs.

SUMMARY OF THE INVENTION

The present invention has been developed in order to remove the above-described drawbacks inherent to the conventional method and apparatus for reading bar codes.

It is, therefore, an object of the present invention to provide a method and apparatus for reading bar codes with which accurate reading can be effected even if a bar code label is attached to a curved portion of goods.

According to a feature of the present invention the entire area of a bar code is divided into a pluralilty of fields of vision so that a bar code reader and/or the goods having a bar code label thereon is moved to detect bars in each field of vision one after another by automatically scanning captured bars. Read data in the form of electrical signals are stored in a memory and all the data are combined after completion of reading all the bars of a bar code. Some superfluous data in the combined data will be removed to obtain correct data indicative of the widths of bars of the entire bar code.

In the present invention, in order to avoide error reading the entire bar code is detected by not only a single scanning of a fixed field of vision but by a plurality of scannings effected in a plurality of fields of vision each covering a predetermined region or portion of the entire bar code. To this end, the entire bar code is divided into a plurality of regions, and thus scanning is effected from a first region. An electrical signal obtained in each scanning for each region is processed to be stored in a memory in the form of digital data each indicative of the width of each detected bar. After completion of scannings of all the regions, all the data obtained from respective regions are combined. When combining the data, some superfluous data are removed so that the combined data correctly represent the information carried by the bar code.

In one embodiment of the present invention, superfluous data are removed by using data corresponding to separation bars having a predetermined pattern. The separation bars are located between two consecutive regions in a bar code. In another embodiment, which is directed to read a bar code having no separation bars between two consecutive regions, the number of bars indicated by the combined data is counted to be compared with a predetermined value corresponding to the actual number of the bars. From the comparison, the number of superfluous data can be known, and thus the superfluous data will be removed to obtain correct data representing the information of the entire bar code.

In accordance with the present invention there is provided a method of reading a bar code having parallel bars indicative of information, by means of a reader having a sensor for converting an image into an electrical signal; comprising the steps of: detecting a portion of the bar code for obtaining first data including information of bars at one end of the bar code; storing the first data; detecting another portion of the bar code for obtaining second data including information of bars at the other end of the bar code; storing the second data; and combining the first and second data to obtain resultant data indicative of the entire information of the bar code.

In accordance with the present invention there is also provided apparatus for reading a bar code having parallel bars indicative of information; comprising: first means for detecting each portion of the bar code for obtaining at least first data including information of bars at one end of the bar code, and second data including information of bars at the other end of the bar code, the first means having an optical system for receiving an image of the portion of the bar code, photosensitive means of electronic scanning type for producing an electrical signal indicative of the image, and a signal processing circuit for producing the data in response to the electrical signal from the photosensitive means; and second means for storing at least the first and second data, and for combining the first and second data to obtain resultant data indicative of the entire information of the bar code.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE PREFERRED EMBODIMENTS

Figure 1:
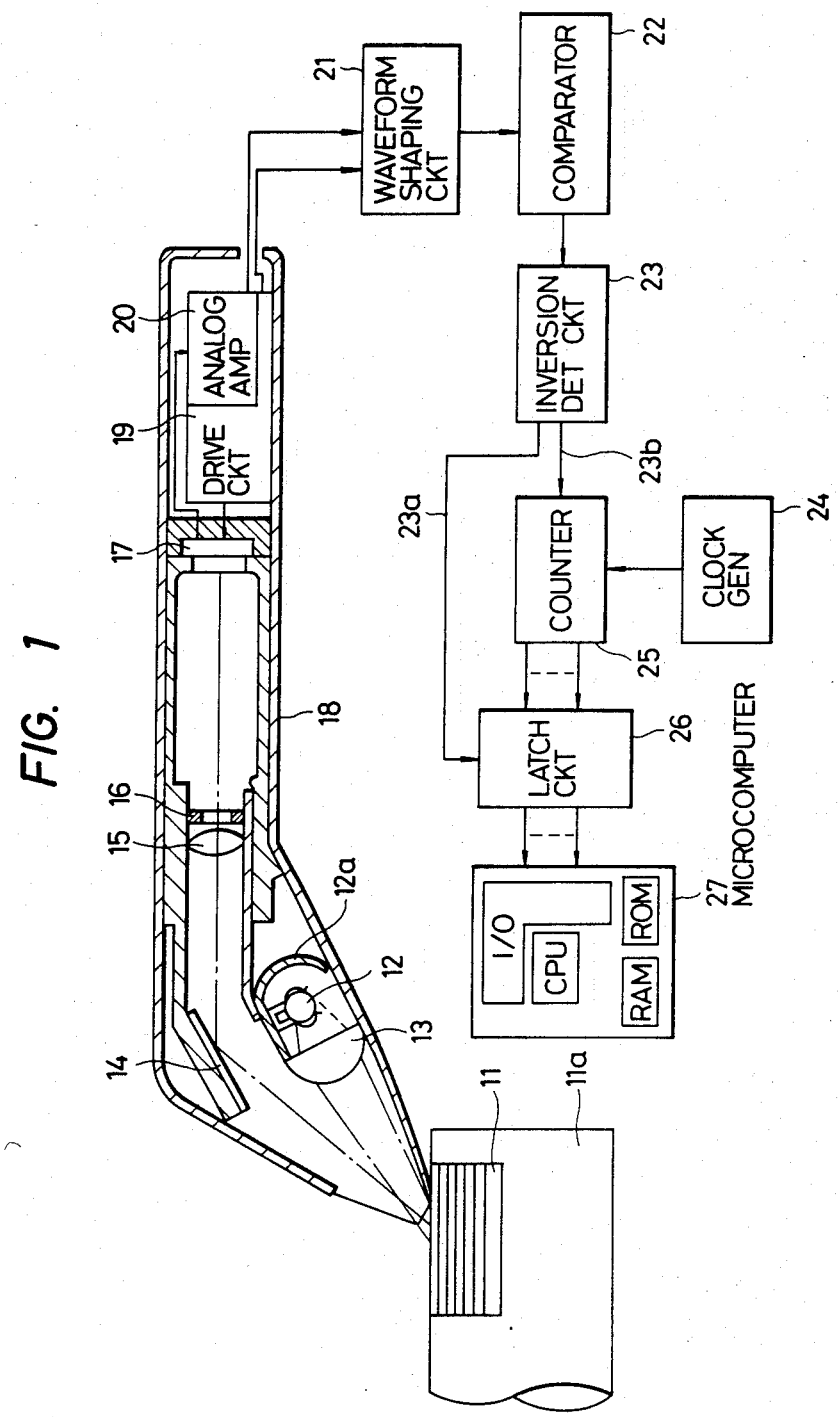
FIG. 1 is a schematic diagram of a bar code reader according to the present invention.
Figure 2:
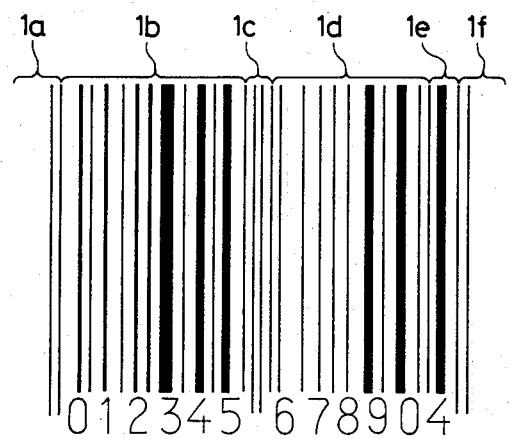
FIG. 2 is an explanatory diagram of the shape of a bar code.
Figure 3:
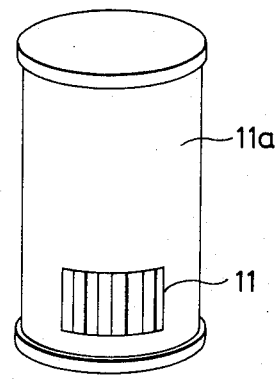
FIG. 3 is a perspective view of goods having a bar code label thereon.

Referring now to FIG. 1, a schematic diagram of a bar reader according to the present invention is shown. The reference numeral 11 is a bar code label on which a bar code has been printed, where the label 11 is attached to cylindrical goods 11a. The bar code comprises white bars and black bars constituting a light and shade pattern of parallel bars so that logic 0s and 1s are coded by means of width of the bars. The pattern of the bar code is arranged to conform to a predetermined format. One example of the bar code has a configuration as shown in FIG. 2, where start bars 1a, left data characters 1b of six places in which figures of 0 to 9 have been coded by two white bars and two black bars, separation bars 1c for separating the left data and right data from each other, right data characters 1d of five places in which figures of 0 to 9 have been coded by two white bars and two black bars, check characters 1e for parity checking, and end bars 1f are successively arranged in parallel. The bar code label 11 is attached to a curved portion of cylindrical goods 11a as shown in FIG. 3.

It is to be noted that the field of vision covered by a reading sensor of the bar code reader is smaller than the entire bar code so that only a portion including the left or right end of the bar code can be scanned when the reader is kept stationary. In the preferred embodiments, it is assumed that the size of the bar code measured in a direction normal to the parallel bars is two or less times the scanning line on the reading sensor. Accordingly, the entire bar code can be detected by two fields of vision. A portion of the bar code captured in a field of vision is referred to as a region. Since first and second fields of vision are respectively obtained, corresponding portions of the bar code are referred to as first and second regions.

The reference 12 is an elongate light source which illuminates the bar code, and it is shown that the illuminating light is incident, through a partially cylindrical lens 13, on the bar code. A curved reflecting mirror 12a is positioned behind the light source 12 so as to strengthen the illuminating light. The reference 14 is a reflecting mirror used for reflecting reflected light from the bar code in a predetermined direction so that the reflected light will pass through a condenser lens 15 and a diaphragm member 16 having an elongate slit to partially image the pattern of the bar code on a scanning line of an image sensor 17 which functions as the reading sensor. The elongate slit is arranged so that its longitudinal direction is perpendicular to the reading direction which is normal to the parallel bars.

The reading sensor 17 uses a one-dimentional image sensor which converts the image of a portion of the bar code on a scanning line into an electrical signal by electronic scanning operation. The reference 18 is a casing made of a synthetic resin for easy gripping of the hand-held reader. In the casing 18 are arranged and fixed the reflecting mirror 14, the lens 15, the diaphragm member 16, the image sensor 17 and so on. A dot-dash line in the optical system of FIG. 1, indicates the locus of light.

The reference 19 is a drive circuit which generates variouis drive pulses to be applied to the image sensor 17 so as to cause the same to perform scanning. The reference 20 is an analog amplifier which amplifies an electrical signal from the image sensor 17, while the reference 21 is a waveform shaping circuit which shapes dispersive amplified signals corresponding to the drive pulses, to convert them into a continuous signal. The reference 22 is a comparator which converts the shaped signal from the waveform shaping circuit 21 into a binary signal of high (H) and low (L) levels respectively corresponding to the black bars and white bars after comparing the shaped signal with a preset reference voltage. The reference 23 is an inversion detecting circuit which detects the inverting instants of the leading and trailing edges of the above-mentioned binary signal so as to produce a reset pulse 23b which is slightly retarded from a latch pulse 23a. These pulses 23a and 23b may be made by a differentiator and a delay circuit both included in the inversion detecting circuit 23. The reference 24 is a clock generator which generates clock pulses of a predetermined high frequency, and the reference 25 is a counter which repeats counting the clock pulses each time it is reset in receipt of the above-mentioned reset pulse 23b, where the counted value thereof indicates a value corresponding to the width of each bar of the bar code. The reference 26 is a latch circuit which stores, in response to the above-mentioned latch pulse 23a, the counted value of the counter 25 immediately before it is reset.

The reference 27 is a microcomputer which executes operations in accordance with a predetermined operational program stored in a ROM so that first read data by the reading operation in the first field of vision including the start bars 1a to the separation bars 1c of the above-mentioned bar code, and second read data by the reading operation in the second field of vision including from the separation bars 1c to the end bars 1f are both temporarily stored, and then reading data of the entire of the above-mentioned bar code are obtained by removing superfluous data indicative of some bars in the vicinity of the separtion bars 1c before the first and second read data are combined.

Now the operation of the first embodiment hand-held bar code reader will be described. In order to read the bar code of the bar code label 11 attached to the curved portion of the cylindrical goods 11a, the goods 11a and the casing 18 of the hand-held reader are respectively held by left and right hands. Then, after the hand-held reader is made operable with the light source 12 energized, the head portion, i.e. the left end in the reader of FIG. 1, of the hand-held reader is directed at parallel bars, centering the first region including from the start bars 1a to the separation bars 1c of the bar code of the goods 11a.

When the hand-held reader is pointed to the first region, the illuminating light from the light source 12 as well as the light from the curved reflecting mirror 12a passes through the partialy cylindrical lens 13 to illuminate the bar code. Since the reflection coefficient at white bars is different from that at black bars, reflected light rays, whose light intensity distribution corresponds to the pattern of the first region of the bar code, passes through the reflecting mirror 14, the lens 15 and the diaphragm member 16 to image an image of the first region on the scanning line of the image sensor 17. Thus, the image is scanned to be converted into an electrical signal. With the provision of the diaphragm member 16 having the elongate slit, the focal depth is made sufficiently deep to avoide unfocussing, and a sufficient amount of light can pass therethrough to ensure accurate reading by the image sensor 17.

Then, since the image of the bar code to be scanned is imaged on the scanning line of the image sensor 17, the image sensor 17, which receives drive pulses of the predetemined frequency from the drive circuit 19, performs an electronic scanning operation to convert the first field of vision into an electrical signal whose voltage level varies in acccordance with the white bars and black bars of the first region of the bar code.

The electrical signal from the image sensor 17 is first amplified by the analog amplifier 20, and is then shaped into a continuous signal by sample-and-hold operation by means of the waveform shaping circuit 21, and is then fed to the comparator 22 to be converted into a binary signal corresponding to the white bars and black bars. The length or width of each of H level and L level pulses of the binary signal is measured by the inversion detecting circuit 23, the clock generator 24 and the counter 25.

Namely, the number of clock pulses is counted by the counter 25 during H level, and then the counted value is held in the latch circuit 26 when the H level is inverted into L level, and immediately after this, the counter 25 is reset to zero to store the value from the latch circuit 26 into the RAM of the microcomputer 27. Then the number of clock pulses is again counted by the counter 25 until L level is inverted into H level, where the counted value will be held in the latch circuit 26 in the same manner to store the same in the RAM of the microcomputer 27. These operations are repeated to input data of width of each bar of the first region of the bar code into the microcomputer 27.

Figure 4:
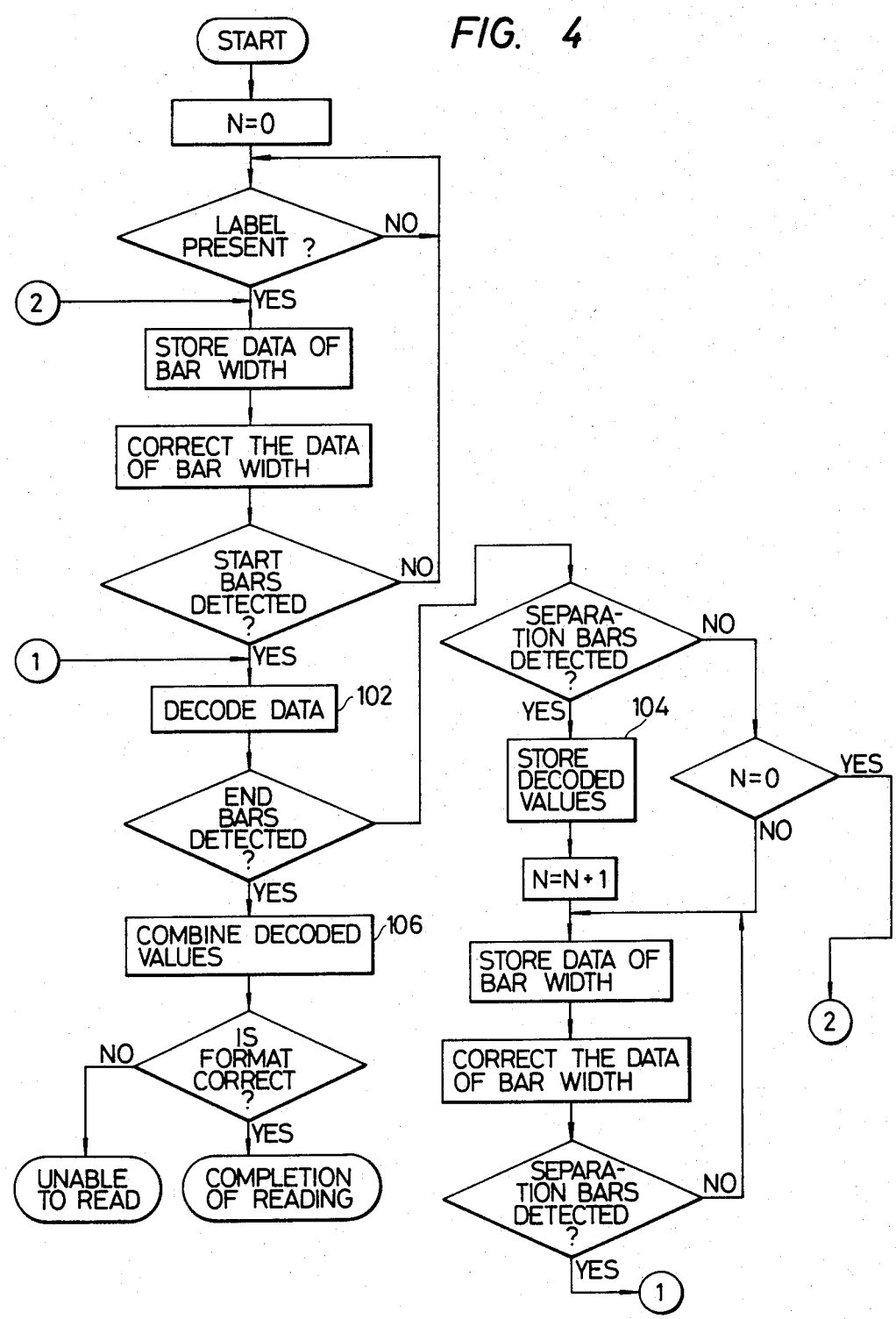
FIG. 4 is a flowchart showing the operation of the microcomputer of FIG. 1.

Numerical value data of the width of each bar, which data are stored in the RAM, are processed in accordance with a flowchart of FIG. 4 by a CPU of the microcomputer 27 to be converted into read data. Namely, it is judged whether a bar code label exists or not by the presence or absence of the reflected light so that data of the widths of bars will be stored in the above-described manner when a label is detected. Usually, due to inaccuracy in printing, the width of each black bar is detected to be either wider or narrower than the width of each white bar, and therefore, stored data are corrected. Subsequently, the start bars 1a are found from corrected data of width of each bar. If the start bars 1a are not detected, scannings are repeated to find the same. When the start bars 1a are recognized, stored data are decoded one after another in a decoding step 102. When the separation bars 1c are detected, decoded values between the start bars 1a and the separation bars 1c are stored, in a storing step 104, into an address of the RAM, corresponding to N=0 as a first read data of the first field of vision wherein N indicates the number of times of effective scannings with which the separation bars 1c are detected; N=0 means a first scanning. And renewal is effected so that N=N+1, completing reading of the left half or the first region of the bar code. If, on the other hand, the separation bars 1c are not found among the data, scannings are continously repeated until the separation bars 1c are found. The above reading operation is completed immediately after the hand-held reader has been arranged at the first region, namely, with a very short period of time of less than 1/10 of a second.

Subsequently to the detection of the first region, the hand-held reader is shifted in a direction which normally intersects the parallel bars of the bar code so that the hand-held reader is arranged at the center of the second region including from the separtion bars 1c to the end bars 1f. Thus, another scanning is effected to detect bars in the second field of vision covering the second region in a similar manner to the above-described detection of the first region. Detection of the bars in the second region is continued until the end bars 1f are found. In other words, scannings are repeated until data indicative of the end bars 1f are found in the stored data. Since, the value of N has been renewed to N=1, the data of the second field of vision will be stored in the address of the RAM, corresponding to N=1. When the end bars 1f are detected, data fetching from the latch circuit 26 is terminated to enter into a combining step 106 in which the data decoded in a decoding step 102 are defined as second read data of the second field of vision. The second read data and the first read data respectively stored in the addresses of the RAM, respectively corresponding to N=0 and N=1, are combined to obtain resultant read data of the whole bar code. After this, format judging is effected to see if the format of the bar code conform to the aforementioned predetermined format. When the format is detected to be correct, operations in the microcomputer 27 are terminated.

As described in the above, in order to avoid impossibility in reading or error reading which are caused by the fact that the apparent width of each bar at both ends of a bar code is imaged as being narrower than the actual width because these bars are oblique to the image sensor 17 in the case of reading a curved bar code, the entire bar code is divided into a plurality of regions so that read data of respective regions will be combined to obtain read data of the entire bar code with high accuracy. Furthermore, a hand-held reader having the same configuration as that used in reading usual bar codes attached to a plane, can be used while all required is to provide a small improvement, i.e. a partial change in the operational process.

Figure 5:
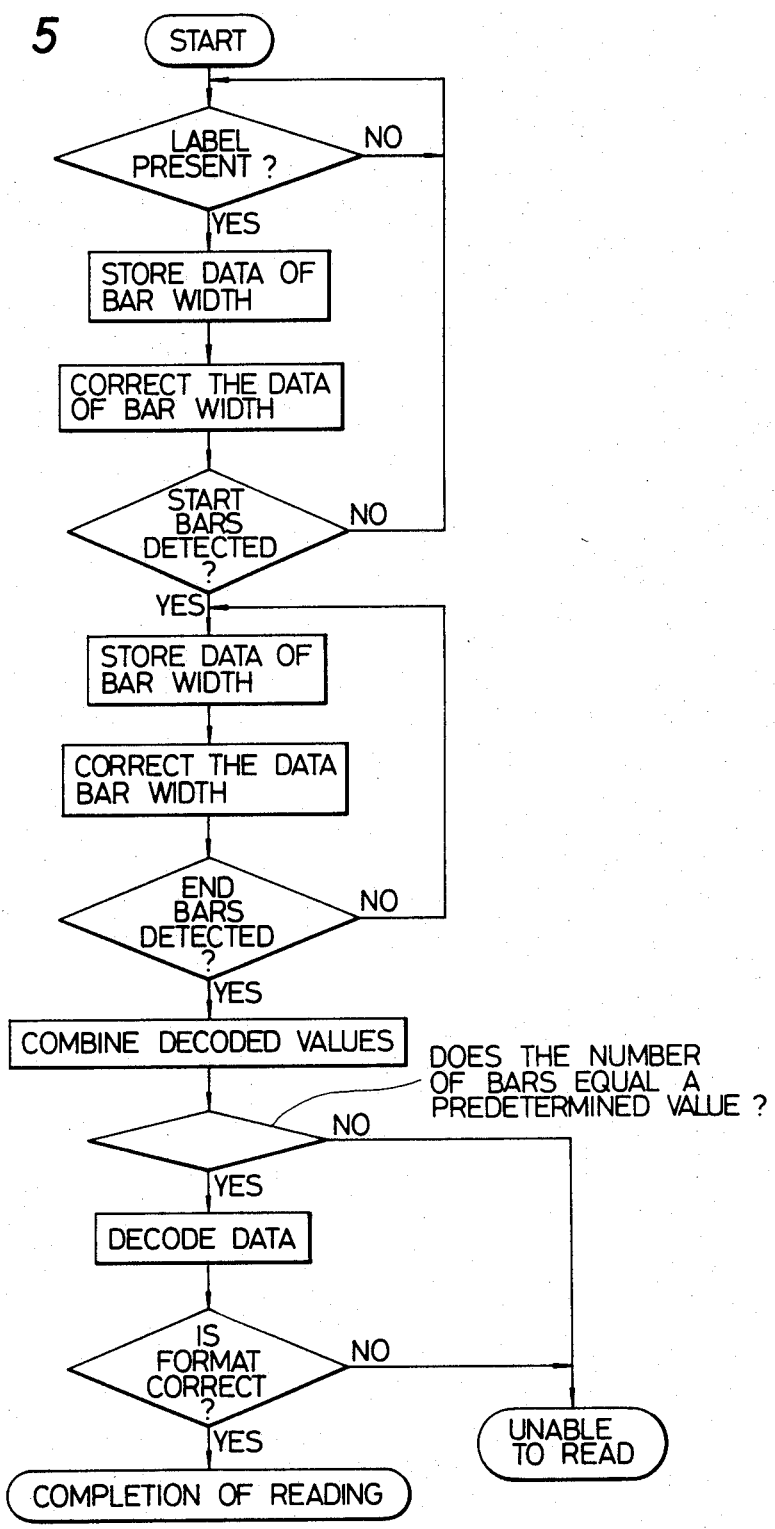
FIG. 5 is a flowchart showing another embodiment of the present invention.

FIG. 5 is a flowchart showing another embodiment of the present invention which is capable of reading a bar code having no separation bars. The entire bar code is divided into a plurality of regions in the same manner as in the first embodiment so that a plurality of times of scanning for respective regions are performed. The same hand-held reader of FIG. 1 as that used in the first embodiment may also be used in the second embodiment, and the second embodiment differs from the first embodiment in that the oprational program for the microcomputer 27 is differently arranged.

First of all, the presence of the bar code label 11 is detected. When the bar code label 11 is detected, data of width of each bar in the first field of vision are stored in the RAM one after another in the same manner as in the first embodiment. The stored data are then corrected to compensate for the variations in the widths of black and white bars. In a following step, the start bars 1a are detected. When the start bars 1a are detected, data of width of each bar obtained by a single scanning in the first field of vision are stored in the RAM. On the contrary, if the start bars 1a are not detected, scannings are repeated to store the data of width of each bar one after another until the start bars 1a are detected. Assuming that, the start bars 1a are detected, the read data at this time are maintained as they are in the RAM. Meanwhile the reader is moved to detect the second region or right half of the bar code so that data of width of each bar in the second region are stored each time of scanning until the end bars 1f will be detected. After this, the first data of width of each bar of the first region obtained when the start bars 1a are detected, and second data of width of each bar of the second region obtained when the end bars 1f are detected are combined. At this time, since the number of bars of the bar code has been known in advance, it will be ascertained where the first and second data are overlapped. In detail, a predetermined value indicative of the actual number of bars of the bar code has been prestored in the ROM or RAM of the microcomputer 27 so that the total number of bars represented by the combined data will be compared with the predetermined value. When the number of bars of the combined data is greater than the predetermined value, superfluous data corresponding to the difference therebetween will be removed from either the first or second data. Thus, superfluous data will be removed to readily obtain correct data of width of each bar of the entire bar code. From the above, it will be understood that it is possible to obtain correct read data corresponding to decoded data of the entire bar code from the combined data even if the bar code has no separation bars between two consecutive regions each covered by a single field of vision.

In the above-described embodiment, although nothing, with which the user of the hand-held reader can ascertain the completion of reading operation in the first field of vision, is shown, a display such as a light-emitting diode which indicates the completion of reading in the first field of vision in receipt of a reading-completion signal from the microcomputer 27, may be added to the hand-held reader.

Although an example that a bar code label 11 is attached to a curved portion has been described, it is possible to obtain read data of the entire of a long bar code by combining more than two data of more than two regions obtained by dividing the long bar code having many places on a bar code label. In this case, a plurality of sets of separation bars may be arranged to distinguish each region from another.

As the reading sensor, although an electronic scanning type image sensor has been described as an example, other types of reading sensors, such as one using laser scanning method or one using a mechanically scanning method may be applied. In such a case, the goods, to which a bar code label has been attached, may be moved manually or automatically, to effect reading of the entire bar code.

In the above-described embodiments, although it has been described that the hand-held reader is moved manually in a direction which intersects the parallel bars, the goods may be moved, or automatic relative movement may be effected. Furtheremore, the present invention provides a superior effect that a reading apparatus having a simple structure can satisfactorily read bar codes with high accuracy.

The above-described embodiments are just examples of the present invention, and therefore, it will be apparent for those skilled in the art that many modifications and variations may be made without departing from the spirit of the present invention.

What is claimed is:

1. A method of reading a bar code having parallel bars indicative of information, by means of a reader having a sensor for converting an image into an electrical signal; comprising the steps of:
   (a) detecting a portion of said bar code for obtaining first data including width information of bars at one end of said bar code;
   (b) storing said first data;
   (c) detecting another portion of said bar code for obtaining second data including width information of bars at the other end of said bar code;
   (d) storing said second data;
   (e) obtaining the number of bars included in said first data, and also the number of bars included in said second data;
   (f) obtaining a total number of bars of said first and second data;
   (g) comparing said number with a predetermined number;
   (h) removing superfluous data from said first and/or second data so that said total number equals said predetermined number; and
   (i) combining said first and second data, from which said superfluous data has been removed, to obtain resultant data indicative of the entire information of said bar code.

2. A method as claimed in claim 1, wherein said step of detecting comprises a step of correcting said data of width of each bar to compensate for variations occurred due to inaccurate printing of said bar code.

3. A method as claimed in claim 1, wherein said step of detecting the first-mentioned portion comprises a step of detecting start bars indicative of starting portion of said bar code.

4. A method as claimed in claim 1, wherein said step of detecting said another portion comprises a step of detecting end bars indicative of ending portion of said bar code.

5. A method as claimed in claim 1, further comprising a step of detecting the presence of a bar code label.

6. A method as claimed in claim 1, further comprising a step of moving said reader in a direction normal to said parallel bars when said step of detecting said first-mentioned portion has been completed, so that said another portion will be detected in sequence.

7. A method as claimed in claim 1, further comprising a step of moving said bar code in a direction normal to said parallel bars when said step of detecting said first-mentioned portion has been completed, so that said another portion will be detected in sequence.

8. Apparatus for reading a bar code having parallel bars indicative of information, comprising:
   (a) first means for detecting each portion of said bar code for obtaining at least first data including width information of bars at one end of said bar code, and second data including width information of bars at the other end of said bar code, said first means having an optical system for receiving an image of said portion of said bar code, photosensitive means of electronic scanning type for producing an electrical signal indicative of said image; and a signal processing circuit for producing said data in response to said electrical signal from said photosensitive means; and
   (b) second means for:
   storing at least said first and second data, obtaining the number of bars included in said first data, and also the number of bars included in said second data;

obtaining a total number of bars of said first and second data;

comparing said number with a predetermined number;

removing superfluous data from said first and/or second data so that said total number equals said predetermined number; and combining said first and second data, from which said superfluous data has been removed, to obtain resultant data indicative of the entire information of said bar code.

9. Apparatus as claimed in claim 8, wherein said optical system comprises;
(a) a light source for illuminating said portion of said bar code;
(b) a condenser lens for condensing light reflected at said bars; and
(c) a diaphragm having an elongate slit for partially passing the light from said condenser lens.

10. Apparatus as claimed in claim 8, wherein said photosensitive means comprises an image sensor.

11. Apparatus as claimed in claim 8, wherein said signal processing circuit comprises:
(a) an analog amplifier responsive to the output signal from said photosensitive means;
(b) a waveform shaping circuit responsive to the output signal from said analog amplifier;
(c) a comparator responsive to the output signal from said waveform shaping circuit and to a predetermined reference voltage for producing a binary signal;
(d) an inversion detecting circuit responsive to said binary signal for producing a pulse in the presence of a leading edge or a trailing edge of said binary signal;
(e) a clock generator for generating clock pulses;
(f) a counter for counting the number of said clock pulses between two consecutive pulses from said inversion detecting circuit; and
(g) a latch for temporarily storing the data from said counter indicative of the width of each bar.

* * * * *